May 26, 1964  LE VERT HARRISON, JR  3,134,619
MOVABLE MOTOR VEHICLE PARKING SPACE PROTECTOR
Filed Aug. 27, 1959  2 Sheets-Sheet 1
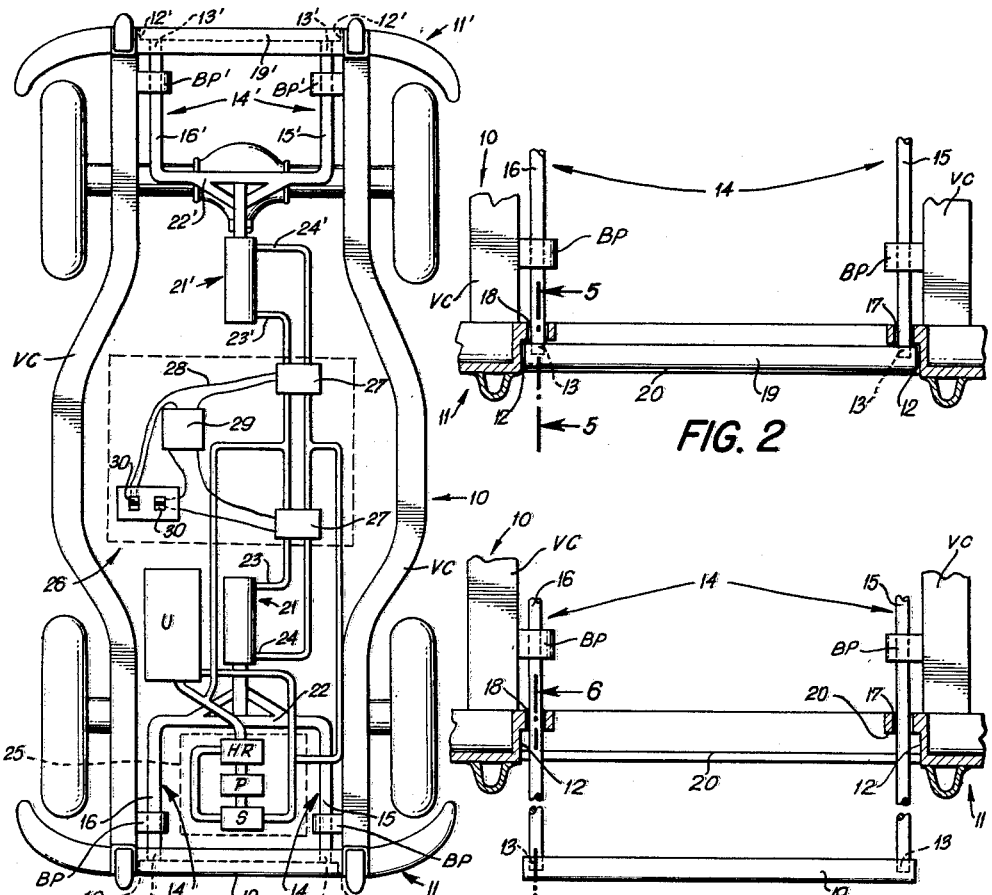
FIG. 1
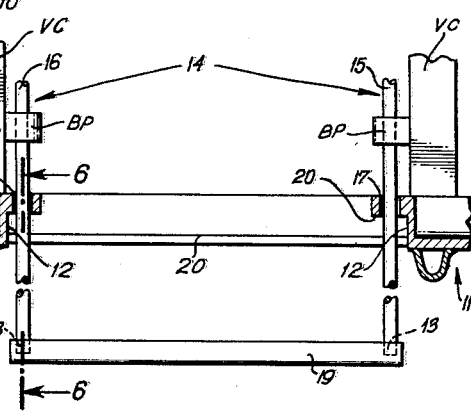
FIG. 2
FIG. 3
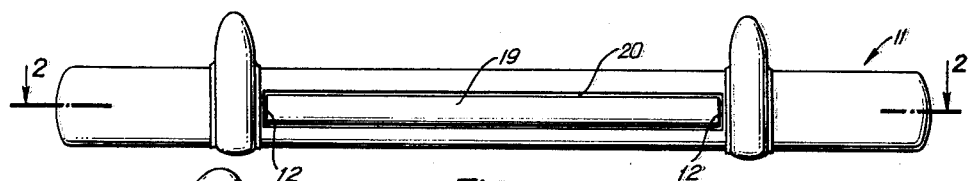
FIG. 4
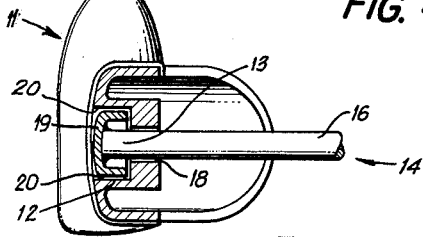
FIG. 5
INVENTOR.
LE VERT HARRISON, JR.

May 26, 1964   LE VERT HARRISON, JR   3,134,619
MOVABLE MOTOR VEHICLE PARKING SPACE PROTECTOR
Filed Aug. 27, 1959   2 Sheets-Sheet 2

INVENTOR.
LE VERT HARRISON, JR.

United States Patent Office 3,134,619
Patented May 26, 1964

3,134,619
MOVABLE MOTOR VEHICLE PARKING SPACE
PROTECTOR
Le Vert Harrison, Jr., 2727 S. Robertson Blvd.,
Los Angeles, Calif.
Filed Aug. 27, 1959, Ser. No. 836,536
8 Claims. (Cl. 293—9)

The present invention consists of controllably extendable and retractable parking space protector apparatus for a motor vehicle which is adapted to be controllably extendable forwardly from the front end of the motor vehicle and/or rearwardly from the rear end of the motor vehicle to a predetermined extent when the motor vehicle occupies a parking space whereby to prevent other motor vehicles adjacent the front and/or rear end from approaching any closer than the parking space determined by the extended apparatus, thus at all times maintaining adequate parking space clearance to allow the motor vehicle to be driven away from the curbing alongside of the parking space without the frequently encountered difficulty in doing so caused by a too-close approach of a motor vehicle positioned in front of or behind the car when it is parked alongside of the curbing.

It is an object of the present invention to provide controllably extendable and retractable parking space protector apparatus for a motor vehicle of the type described above and including extension means adapted to be longitudinally reciprocatably mounted by structural member means (such as a bumper, for example, although not specifically so limited) at either the front end or the rear end of a motor vehicle or at both ends thereof in a manner controllably extendable away from the motor vehicle to a predetermined extent and controllably retractable with respect to the mounting structural member means or bumper and into a recessed position protected thereby from exteriorly caused accidental impact and consequent damage to the extension means which might otherwise occur.

It is a further object to provide apparatus of the character set forth in the preceding object, wherein the extension means is connected to controllably energizable actuator means carried by the motor vehicle for controllably longitudinally extending and retracting the extension means, usually under the control of dashboard-mounted switch means or pushbutton means, whereby either a front or rear actuator means and connected extension means may be forwardly or rearwardly extended and/or retracted or both may be controllably extended and/or retracted.

It is a further object to provide apparatus of the character referred to above, wherein the extension means includes two horizontally laterally substantially parallel longitudinal connecting rod members slidably carried in corresponding apertures in a front bumper, a rear bumper, or in both the front and rear bumpers, with each pair of said connecting rod members having outer ends horizontally laterally provided with, and interconnected by, a laterally directed longitudinal interconnecting member adapted to lie in a corresponding laterally directed recessed groove carried by the bumper.

It is a further object to provide apparatus of the character set forth in any of the preceding objects, wherein each of the actuator means comprises double action fluid motor means (or hydraulic cylinder) controllably connected to a source of fluid under pressure carried by the motor vehicle, and including dashboard-mounted controllable switch means or push-button means for effectively connecting the source of fluid under pressure to the fluid motor means in an extension manner and in a retraction manner so that either a front extension means or a rear extension means or both may be independently or simultaneously extended and/or retracted.

It is a further object to provide apparatus of the character set forth in any of the preceding objects, including overriding means associated with the extension means and adapted, upon forcible contact of said extension means with a solid object during an extension operation, to effectively prevent further extension of said extension means.

It is a further object to provide apparatus of the character set forth in the preceding object, wherein said overriding means comprises limit switch means and electric circuit means suitably electrically energized and in circuit with means for effectively deactivating said fluid motor means.

It is a further object to provide apparatus of the character set forth in the second preceding object, wherein said overriding means comprises overriding spring means adapted to effectively prevent further extension of the extension means when force is exerted against the outer end thereof in excess of a predetermined value.

It is a further object to provide apparatus of the character set forth in any of the preceding objects, in combination with a motor vehicle having bumpers at the front and rear ends thereof with at least one of said bumpers being provided with countersunk recess means extending thereinto from the outer surface thereof and adapted to receive the forward portion of the extension means when in the fully retracted position, whereby to fully protect said extension means from exteriorly caused accidental impact.

It is a further object to provide apparatus of the character set forth in any of the preceding objects which is of extremely simple, cheap, foolproof construction such as to facilitate widespread use thereof.

Further objects will be apparent to persons skilled in the art after a careful study hereof.

For the purpose of clarifying the nature of the present invention, several exemplary embodiments are illustrated in the hereinbelow-described figures of the accompanying drawings and are described in detail hereinafter.

FIG. 1 is a diagrammatic, partial, fragmentary, top plan view illustrating one exemplary embodiment of the present invention shown diagrammatically in mounted relationship with respect to a motor vehicle which has the entire body and engine removed for drawing simplification purposes. However, the view does show the mounting of the extension means in both the front and rear bumpers and shows the fluid motor means for operating same connected to a source of fluid under pressure such as the conventional source of fluid under pressure associated with a conventional power steering system or hydraulic braking system frequently provided in a motor vehicle of the type illustrated.

FIG. 2 is a fragmentary view of just the front portion of the automobile frame and bumper shown in FIG. 1 with the bumper being shown in section in the direction of the arrows 2—2 of FIG. 4. The extension means is shown in retracted position.

FIG. 3 is a view similar to FIG. 2 but shows the extension means in extended position.

FIG. 4 is a front elevational view of the front end of the apparatus of FIG. 1.

FIG. 5 is a fragmentary vertical sectional view taken in the direction of the arrows 5—5 of FIG. 2.

Figure 8:
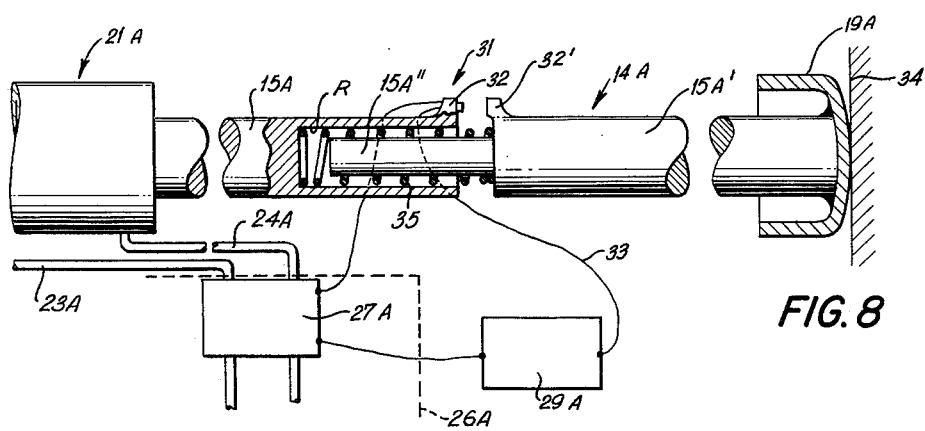

FIG. 8 is a fragmentary, diagrammatic view illustrating a slight modification of the invention including overriding means comprising limit switch means and electric circuit means suitably electrically energized and in circuit with solenoid means for effectively deactivating the corresponding one of the fluid motor means whereby to effectively prevent further extension of any of the extension means during an extension operation after it has made forcible contact with a solid object.

Figure 9:
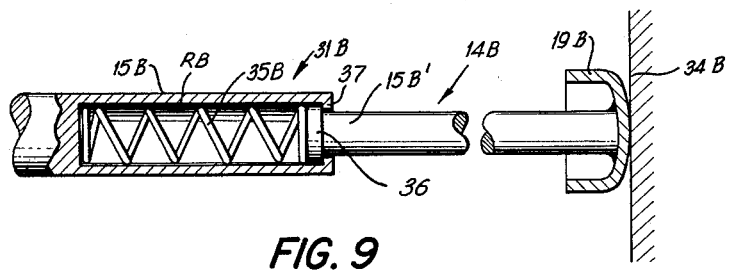

FIG. 9 is a fragmentary view illustrating a slight modification of the overriding means of FIG. 8.

Figure 6:
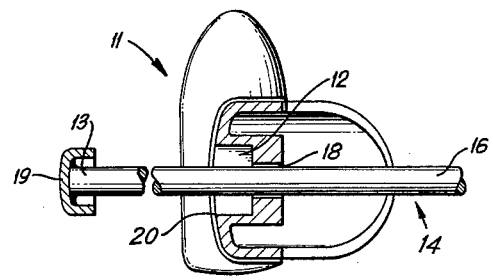
FIG. 6 is a fragmentary vertical sectional view of the arrows 6—6 of FIG. 3.
Figure 7:
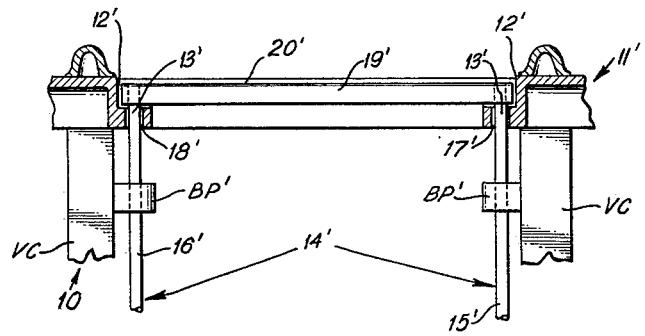
FIG. 7 is a view similar to FIG. 2, but shows the rear bumper and rear extension means.

The controllably extendable and retractable parking space protector apparatus of the present invention is adapted for use with a motor vehicle, such is indicated generally at 10, of the type having bumpers at the front and rear ends thereof, such as are indicated generally at 11 and 11', with each of the bumpers 11 and 11' in the specific example illustrated being provided with a pair of spaced countersunk recess means, such as indicated at 12 and 12', respectively, extending thereinto from the outer surface thereof and being adapted to receive the forward ends 13 and 13' of front and rear extension means indicated generally at 14 and 14', respectively, whereby the heads 13 and 13' of the extension means 14 and 14', when in the retracted positions shown collectively in FIG. 1 and shown individually in FIGS. 2 and 7 will be effectively completely protected by corresponding bumpers 11 and 11' from exteriorly caused accidental impact, thus minimizing the possibility of the apparatus of the present invention being accidentially damaged in the event of a front or rear end collision with another automobile while the extension means are retracted.

Since the front and rear extension means 14 and 14' are similar, the description which follows immediately hereinafter will refer specifically only to the front extension means 14, it being understood that corresponding parts of the rear extension means 14' are similar and operate in the same manner and are indicated by corresponding reference numerals, primed however. The front extension means illustrated at 14 takes one specific form wherein it includes two horizontally laterally spaced substantially parallel longitudinal connecting rod members 15 and 16 slidably apertured bearing portions BP attached to the vehicle chassis VC and also slidably carried in corresponding apertures 17 and 18 in the front bumper 11 and being connected to the enlarged countersunk recess means 12; each of the rod members 15 and 16 having its outer end 13 horizontally laterally provided with and interconnected by a laterally directed longitudinal interconnecting member 19 lying in a corresponding laterally directed recessed groove 20 carried in the outer or front surface of the bumper 11. It should be noted that the front ends 13 of the rods 15 and 16 and the interconnecting member 19 normally lie completely within the corresponding recess means 12, and 20, when the extension means 14 is in the retracted position shown in FIG. 2, whereby said extension means 14 will be fully protected from exterior impact in the event that the front bumper 11 is struck by or strikes another solid object while the extension means 14 is in the retracted position shown in FIG. 2.

In the specific example illustrated, the hereinbefore generally mentioned controllably energizable actuator means takes the form of two actuators 21 and 21' connected, respectively, to inner interconnecting members 22 and 22' carried by the inner ends of rods 15, 16, and 15', 16' of the front and rear extension means 14 and 14', respectively. In accordance with the practice of describing only one of similar parts, as previously referred to hereinbefore, only the front actuator means 21 will be described in detail, it being understood that the rear actuator means 21' is similar. Each of the actuator means comprises a double action fluid motor means connected by lines 23 and 24 in the case of the front actuator 21 and lines 23' and 24' in the case of the rear actuator 21' to a source of fluid under pressure, such as that generally diagrammatically indicated at 25, through dashboard-mounted multiple controllable switch means, indicated generally and diagrammatically at 26, for effectively connecting the source of fluid under pressure 25 to either of the fluid motor means 21, 21', and in either direction, for the purpose of extension and/or retraction thereof either individually or simultaneously, whereby to cause corresponding extension and/or retraction of the corresponding extension means 14 or 14' with respect to the corresponding mounting bumper 11 or 11', such as is indicated individually in FIGS. 2 and 7. It should be noted that the source of fluid under pressure may be that associated with that of a conventional automobile power steering system, hydraulic braking system, or pneumatic braking system, or may be a completely independent source of fluid under pressure normally comprising a pump P, a high-pressure reservoir HR connected to the outlet side of the pump, some utilization or fluid motor apparatus (indicated in block diagram form at U) such as a power steering system, hydraulic braking system, or the like, and a low-pressure sump S connected thereto and connected to the inlet side of the pump, with the high-pressure reservoir normally being provided with pressure-responsive means controlling the pump whereby to deactivate same when the pressure within the high-pressure reservoir reaches a predetermined value. However, any suitable source of pressurized fluid may be employed. This is indicated entirely generally and diagrammatically at 25, since such systems are well known and do not comprise the inventive aspect of applicant's invention. The dashboard-mounted multiple controllable switch means, indicated generally and diagrammatically at 26, for use in effectively controllably operating the two fluid motor means, 21 and 21', in either direction, may comprise a plurality of solenoid actuated valves, indicated at 27, connected by suitable electric circuit means 28 to a source of electric power 29, which may be a conventional storage battery or the like, although not so limited, and with the switch means 30 being adapted to effectively appropriately energize solenoid valve means 27 whereby operation of the appropriate one of the switch means 30 in the appropriate manner will cause corresponding energization of the corresponding solenoid valve means 27 whereby to cause extension or retraction of the selected corresponding fluid motor means 21 or 21'.

FIG. 8 illustrates a slight modification of one of the extension means and is exemplary of the arrangement which would be provided in the other extension means also in this modified form of the invention. In this modification, parts similar to those illustrated in the first form of the invention shown in FIGS. 1–7 and described in detail hereinbefore are indicated by similar reference numerals, followed by the letter "A" however. In this modification, the exemplary extension means indicated generally at 14A includes two portions shown at 15A and 15A'. In the form illustrated in FIG. 8, the portion 15A comprises a rod having an interior recess R in the end thereof and the portion 15A' comprises a rod having a reduced plunger portion 15A" received within the recess R. In the form illustrated, a compression spring 35 has one end effectively fastened to the inner end of the recess R and has its opposite end effectively fastened with respect to the rod member 15A' and is in an uncompressed or at-rest position as shown in FIG. 8. The rod portion 15a is provided with a limit switch 32 while the rod portion 15A' is provided with a limit switch actuator element 32' adapted to effectively strike and close the limit switch 32 whenever the member 19A carried by the forward end of the rod 15A' strikes a solid object, such as that indicated at 34, while the left rod portion 15A continues to be moved forwardly as a result of continued operation of the fluid motor means 21A. As soon as the limit switch actuating element 32' closes the limit switch 32, power from the battery 29A energizes the solenoid valve means 27A in a manner such as to immobilize the fluid motor means 21A, thereby stopping further extension of the extension means 14A. When the member 19A is not in contact with a solid object such as that indicated at 34, the spring 35 will never extend the forward rod portion 15A' beyond the point shown in FIG. 8, and, in fact, will retain the forward rod portion 15A' in said position until the next compressive relative actuation of the two rod portions 15A and 15A' in a limit-switch-closing manner occurs. It should be clearly noted that the controllably extensible resiliently biased coupling of the two rod portions 15A and 15A' and the limit switch 32 and limit switch actuating element 32' effectively comprise overriding means, indicated generally at 31.

FIG. 9 illustrates a slightly modified form of overriding means, indicated generally at 31B, wherein it comprises the left rod portion 15B and the right rod portion 15B', with the left rod portion 15B being recessed at RB and with the right rod portion 15B' being positioned in said recess RB and having a head or stop member 36 adapted to abut a retaining lip 37 when in the fully extended position shown in FIG. 9. A compression spring 35B is positioned between the inner end of the recess RB and the head or stop member 36 whereby to normally bias the right rod portion 15B' of the extension means 14B into fully extended relationship with respect to the left rod portion 15B as shown in FIG. 9. However, the two rod portions 15B and 15B' are effectively forcibly slidable with respect to each other whenever the member 19B carried by the forward end of the extension means 14B strikes a solid object such as that indicated at 34B. This causes force in excess of that exerted by the spring means 35B to effectively be applied thereto by the rear end of the recess RB and the head or stop member 36 whereby to cause the two rod portions 15B and 15B' to effectively telescope in a manner preventing any further extension of the member 19B even though the member 15B may continue to be moved forwardly by the fluid motor means.

It should be noted that while the actuators are shown in the drawing and have been described hereinbefore in one specific embodiment wherein they comprise fluid motors, it should be noted that the invention is not so limited, and the actuators may take a variety of other forms. For example, each of the actuators might be electric-motor operated and be of the type commonly known in the art as a "lead screw," or may take a variety of other forms.

It should be noted that the extension means may also be modified and may be of yoke form, as illustrated, or may assume various other configurations, and may be slidably supported in the manner indicated in the drawings or may be provided with a variety of other equivalent support means for slidably supporting same. The interconnecting member or bar normally recessed in a corresponding groove in the outer side of the bumper may assume a variety of different shapes and/or configurations suitable for cooperation with a variety of different shapes and/or configurations of bumpers, and may be modified substantially within the basic spirit, scope, and teachings of the present invention.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. Controllably extendable and retractable parking space protector apparatus, comprising: a bumper having a lateral direction and a longitudinal direction and being elongated in said lateral direction and having a shallow front-to-back depth in said longitudinal direction, said laterally elongated bumper effectively comprising an end bumper for a motor vehicle, said vehicle having a longitudinal direction between front and rear ends thereof and a lateral direction between sides thereof, said laterally elongated bumper being adapted to be mounted extending across one end of the motor vehicle in said lateral direction with said front-to-back depth of said bumper lying in said longitudinal direction of the motor vehicle, said laterally elongated bumper being provided with two aperture means laterally spaced apart in said lateral direction and extending through said laterally elongated bumper in said front-to-back longitudinal direction, each aperture means being provided with and terminating outwardly in countersunk recess means, and with said bumper being provided with a laterally directed recessed groove interconnecting said countersunk recess means; extension means longitudinally reciprocatably mounted on said bumper in a manner controllably extendable away from the bumper to a predetermined extent and controllably retractable toward the bumper and into said countersunk recess means whereby to fully protect said extension means from exteriorly caused accidental impact when fully retracted, said extension means including two horizontally laterally spaced substantially parallel longitudinal connecting rod members slidably carried in corresponding ones of said aperture means in said bumper and having outer ends horizontally laterally provided with and interconnected by a laterally directed interconnecting member shallower in said longitudinal direction than the depth in said longitudinal direction of said laterally directed recessed groove of said bumper and lying entirely within said groove when fully retracted; and controllably energizable actuator means displaced in said longitudinal direction from said bumper and connected to said extension means for controllably longitudinally extending and retracting same.

2. Apparatus of the character defined in claim 1, including overriding means connected to said extension means and adapted, upon forcible contact of said extension means with a solid object during an extension operation, to effectively prevent further extension of said extension means.

3. Apparatus of the character defined in claim 1, including overriding means connected to said extension means and adapted, upon forcible contact of said extension means with a solid object during an extension operation, to effectively prevent further extension of said extension means, said overriding means comprising limit switch means and electrically energizable electric circuit means in circuit with means for effectively deactivating said actuator means.

4. Apparatus of the character defined in claim 1 including an additional bumper elongated in said lateral direction and having a shallow front-to-back depth in said longitudinal direction and having two laterally spaced and longitudinally directed aperture means provided with and terminating outwardly in countersunk recess means and having a laterally directed recessed groove interconnecting said countersunk recess means, said additional bumper being provided with an additional extension means longitudinally reciprocatably mounted in said aperture means of said additional bumper means in a manner controllably extendable away from said additional bumper in a direction opposite to the controllable extension of said first mentioned extension means away from said first mentioned bumper to a predetermined extent and controllably retractable toward said additional bumper; said additional extension means being provided with an additional controllably energizable actuator means displaced in said longitudinal direction from said additional bumper and connected to said additional extension means for controllably extending and retracting same in said longitudinal direction relative to said additional bumper, said first-mentioned actuator means and said additional actuator means each comprising double action fluid motor means provided with interconnecting conduit means, a source of fluid under pressure and means in circuit therewith for controlling the flow of pressurized fluid to either of said fluid motor means for controlled operation of either of said actuator means whereby to extend or retract the corresponding extension means.

5. Controllably extendable and retractable parking space protector apparatus for a motor vehicle, comprising: a motor vehicle having a lateral direction between sides thereof and a longitudinal direction between front and rear ends thereof and having bumpers at the front and rear ends thereof with at least one of said bumpers being provided with two aperture means laterally spaced and longitudinally directed in said lateral and longitudinal directions relative to said motor vehicle, each aperture means being provided with and terminating outwardly in countersunk recess means, and with said bumper being provided with a laterally directed recessed groove interconnecting said countersunk recess means; extension means longitudinally reciprocatably mounted by at least said one of said bumpers provided with recess means in a manner controllably extendable away from the bumper to a predetermined extent and controllably retractable toward the bumper and into said countersunk recess means whereby to fully protect said extension means from exteriorly caused accidental impact when fully retracted, said extension means including two horizontally laterally spaced substantially parallel longitudinal connecting rod members slidably carried in corresponding ones of said aperture means in said bumper and having outer ends horizontally laterally provided with and interconnected by a laterally directed interconnecting member shallower in said longitudinal direction than the depth in said longitudinal direction of said laterally directed recessed groove of said bumper and lying entirely within said groove when fully retracted; and controllably energizable actuator means carried by the motor vehicle and connected to said extension means for controllably extending and retracting same in said longitudinal direction relative to said motor vehicle, said actuator means comprising double action fluid motor means controllably connected to a source of fluid under pressure carried by said motor vehicle and including dashboard-mounted controllable switch means for effectively connecting the source of fluid under pressure to the fluid motor means in an extension manner and in a retraction manner.

6. Apparatus of the character defined in claim 5, including overriding means connected to said extension means and adapted upon forcible contact of said extension means with a solid object during an extension operation to effectively prevent further extension of said extension means.

7. Apparatus of the character defined in claim 5, including overriding means connected to said extension means and adapted upon forcible contact of said extension means with a solid object during an extension operation to effectively prevent further extension of said extension means, said overriding means comprising limit switch means and electric circuit means suitably electrically energized and in circuit with means for effectively deactivating said fluid motor means.

8. Apparatus of the character defined in claim 5 wherein the other one of said bumpers is provided with two laterally spaced and longitudinally directed aperture means provided with and terminating outwardly in countersunk recess means and having a laterally directed recessed groove interconnecting said countersunk recess means, said other bumper being provided with an additional extension means longitudinally reciprocatably mounted in said aperture means of said other bumper in a manner controllably extendable away from said other bumper to a predetermined extent and controllably retractable toward said other bumper and into said countersunk recess means whereby to fully protect said additional extension means from exteriorly caused accidental impact when in said groove; and including an additional controllably energizable actuator means carried by the motor vehicle and connected to said additional extension means for controllably longitudinally extending and retracting same, said additional actuator means being controllably connected to said source of fluid under pressure carried by said motor vehicle and said dashboard-mounted controllable switch means for effectively connecting the source of fluid under pressure to said additional actuator means in an extension manner and in a retraction manner.

References Cited in the file of this patent

UNITED STATES PATENTS

| | | |
|---|---|---|
| 1,593,866 | Christinzo | July 27, 1926 |
| 1,646,055 | Ebaugh | Oct. 18, 1927 |
| 1,672,243 | Blake | June 5, 1928 |
| 1,803,078 | Springfield | Apr. 28, 1931 |
| 1,816,120 | Lea | July 28, 1931 |
| 2,191,368 | Cavanaugh | Feb. 20, 1940 |
| 2,274,440 | Tozier | Feb. 24, 1942 |
| 2,584,078 | Hsu Hsi-Yu | Jan. 29, 1952 |
| 2,588,815 | Fasolino | Mar. 11, 1952 |

FOREIGN PATENTS

| | | |
|---|---|---|
| 487,419 | Great Britain | June 21, 1938 |